United States Patent [19]
Hata et al.

[11] Patent Number: 5,419,858
[45] Date of Patent: May 30, 1995

[54] METHOD FOR CONTROLLING FLUCTUATION IN FLOW PROPERTY OF RESIN IN INJECTION MOLDING MACHINE

[75] Inventors: Masaharu Hata, Utsunomiya; Akira Nonomura, Tochigi, both of Japan

[73] Assignee: KAO Corporation, Tokyo, Japan

[21] Appl. No.: 983,140

[22] Filed: Nov. 30, 1992

[30] Foreign Application Priority Data

Nov. 28, 1991 [JP] Japan ................... 3-337887

[51] Int. Cl.⁶ ................... B29C 45/77; B29C 45/78
[52] U.S. Cl. ................... 264/40.5; 264/40.6; 264/328.14
[58] Field of Search ............. 264/40.1, 40.5, 40.6, 264/328.14, 328.15, 328.16

[56] References Cited

U.S. PATENT DOCUMENTS

| | | | |
|---|---|---|---|
| 4,851,170 | 7/1989 | Shimizu et al. | 264/40.5 |
| 4,889,667 | 12/1989 | Kojima et al. | 264/40.5 |
| 4,968,462 | 11/1990 | Hara | 264/40.5 |
| 5,030,395 | 7/1991 | Kamiguchi et al. | 264/40.5 |
| 5,256,345 | 10/1993 | Yokota | 264/40.5 |

Primary Examiner—Mathieu D. Vargot
Attorney, Agent, or Firm—Fish & Richardson

[57] ABSTRACT

Molded articles having a constant quality can be obtained at all times irrespective of a fluctuation in resin properties (especially flowability). An output signal from an injection pressure sensor is sampled by a sampling circuit, and an injection-pressure waveform is obtained from injection-pressure data by means of a processing unit. If injection time fluctuates in the injection-pressure waveform, a constant-pressure injection process is judged to be in effect. If the maximum value of injection pressure fluctuates, then the process is judged to be a constant-speed injection process. The set temperature in a temperature setting unit is changed in dependence upon a fluctuation in injection time in the constant-pressure injection process and in dependence upon a fluctuation in the maximum value of injection pressure in the constant-speed injection process. The resin temperature is controlled by controlling heaters via temperature controllers. As a result, injection time or the maximum value of injection pressure is held substantially constant at all times, and so is the flowability of the resin.

5 Claims, 15 Drawing Sheets

CONSTANT-PRESSURE INJECTION PROCESS

CONSTANT-SPEED INJECTION PROCESS

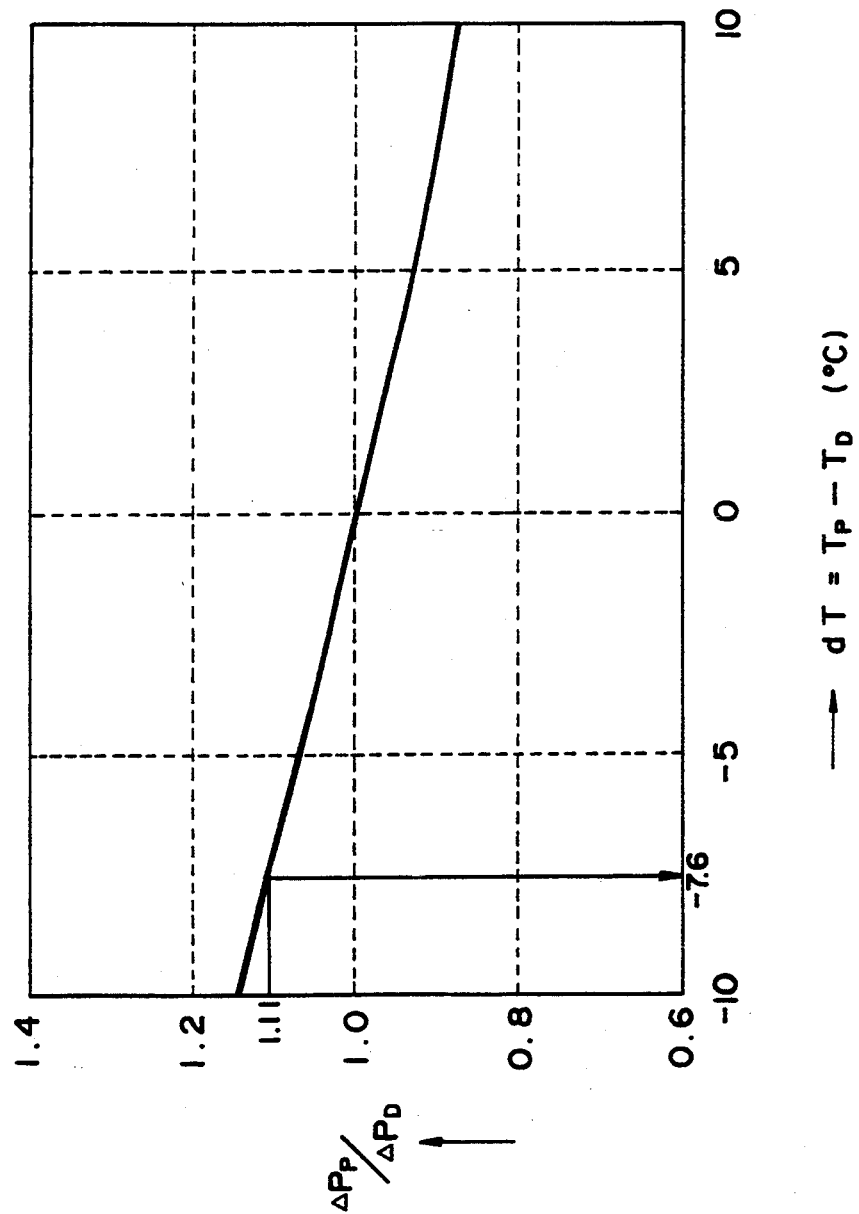

METHOD FOR CONTROLLING FLUCTUATION IN FLOW PROPERTY OF RESIN IN INJECTION MOLDING MACHINE

BACKGROUND OF THE INVENTION

1. Field of the Invention

This invention relates to a method and apparatus for controlling molding conditions in such a manner that molded articles of uniform quality are obtained at all times irrespective of any fluctuation in the flow properties of a resin in an injection molding machine, and especially an injection molding machine which uses a mold with a hot-runner.

2. Description of the Related Art

In recent injection molding machines, the repetitive operating precision and stability of the molding machine itself have been greatly improved due to improvements in the response of the hardware constituting the control circuitry and the use of closed-loop control.

However, since the plastic material used in injection molding is produced by a complicated polymerization reaction, the occurrence of some scatter or variance in the properties of the plastic material cannot be avoided due to variances in the raw material and difficulties in controlling the polymerization reaction. In particular, in resin materials produced by the batch method, maintaining the material properties constant from one batch to another is extremely difficult.

By way of example, when the value of the MFI (melt-flow index) which is one parameter representing resin flowability and which has the greatest influence upon injection molding, is observed, in fact the actual MFI value fluctuates by approximately ±10% with respect to the value indicated in a catalog even if the resin is one manufactured under fairly sophisticated management and control. Furthermore, in the case of a colored material, there is of course a variance in properties from one color to another due to a difference in the pigments and a difference in the compounding of additives resulting from the difference in pigments. Even if color is the same, there is a tendency for the variance to increase due to an increase in fluctuating factors.

Even if the control precision of an injection molding machine per se is improved, a disparity in the quality of the molded articles develops because of a fluctuation in resin properties. In particular, a fluctuation in the quality (dimensions, weight, warpage, etc.) of the molded articles which arises when resin lots are changed over from one to another cannot be avoided. Accordingly, an on-site technician must monitor the molding machine at all times and sense any fluctuation in resin properties, and the technician must adjust the molding conditions so as to hold the quality of the molded articles constant. Even if the same mold is used, it is well known on site that it is always necessary to change the molding conditions when a resin of a different color is used. In any case, the state of the art is that a change in molding conditions is carried out by repetitive trial and error, which requires much time and labor.

SUMMARY OF THE INVENTION

An object of the present invention is to reduce the labor of on-site technicians by automating or semi-automating the sensing of a fluctuation in the flow property of a resin material as well as the adjustment of molding conditions.

Another object of the present invention is to stabilize the quality of molded articles by arranging that a fluctuation in the flow property of a resin material is sensed through a systematic technique and so that optimum conditions for molding can be set through a systematic technique.

The present invention provides a method of judging the properties of a molding process in order to control a fluctuation in resin flow property in an injection molding machine.

The inventor has discovered that injection molding processes are of two types, namely a constant-pressure injection process and a constant-speed injection process. A feature of the present invention resides in judging whether the injection process is a constant-pressure injection process or constant-speed injection process.

A method of judging a molding process according to the present invention comprises a step of measuring an injection-pressure waveform in a molding cycle of an injection molding machine over a plurality of molding cycles, a step of examining whether a fluctuation in flow property of a resin material supplied to the injection molding machine appears as a fluctuation in injection time or as a fluctuation in maximum value of injection pressure in the injection-pressure waveform, and a step of judging that the injection process is a constant-pressure injection process when the fluctuation appears as a fluctuation in injection time and as a constant-speed injection process when the fluctuation appears as a fluctuation in maximum value of injection pressure.

As will be described later, there is a method of controlling a fluctuation in resin flow property suited to the constant-pressure injection process and a method of controlling a fluctuation in resin flow property suited to the constant-speed injection process. In accordance with the invention, it can be determined whether the injection process is the constant-pressure injection process or the constant-speed injection process. This makes it possible to select the control method that is suited to the process.

The present invention further provides a method and apparatus for controlling a fluctuation in resin flow property suited to the constant-pressure injection process.

A method of controlling a fluctuation in resin flow property in an injection molding machine according to the present invention comprises a step of measuring actual injection time in a molding cycle of an injection molding machine, a step of obtaining a degree of fluctuation in the measured actual injection time with respect to a standard injection time, a step of judging whether the degree of fluctuation obtained exceeds a predetermined value, and a step of controlling resin temperature so that actual injection time will approach the standard injection time if the degree of fluctuation obtained exceeds the predetermined value.

An apparatus for controlling a fluctuation in resin flow property in an injection molding machine according to the present invention comprises an injection-pressure sensor for sensing injection pressure of the injection molding machine and outputting a signal representing the injection pressure, injection-time measuring means for measuring actual injection time in a molding cycle of the injection molding machine based upon an output signal from the injection-pressure sensor, heating means for heating resin within the injection molding machine, temperature measuring means for measuring the temperature of the resin within the injection molding machine, means for obtaining a degree of fluctuation in the actual injection time, which has been measured by the injection-time measuring means, with respect to a standard injection time, and judging whether the degree of fluctuation is outside a predetermined range, and temperature control means for controlling the heating means, using the resin temperature measured by the temperature measuring means as well as the relationship between the injection time and resin temperature, so that actual injection time will become equal to the standard injection time when the judging means has judged that the degree of fluctuation is outside the predetermined range.

In accordance with the present invention, the injection pressure actually applied to the resin in an injection molding machine is sensed and the injection time is measured based upon a change in the injection pressure. The actual injection time reflects the actual flow property of the resin. The injection time is short when the flowability of the molten resin is high and long when the resin flowability is low. The flowability of the resin has a great effect upon the quality (dimensions, weight, warpage, etc.) of the molded articles.

In accordance with the present invention, control is performed in such a manner that the resin temperature is made relatively low to diminish resin flowability in relative terms when the injection time has become somewhat short in comparison with the standard injection time. Conversely, control is performed to raise the resin temperature if the injection time has lengthened. As a result of such control, injection time (i.e., resin flowability) is maintained substantially constant at all times. The standard injection time mentioned here refers to injection time measured under molding conditions in which molded articles exhibiting excellent quality are obtained. Accordingly, molded articles of excellent quality are obtained at all times even if there is a fluctuation in the properties of the resin.

The present invention further provides a method and apparatus for controlling a fluctuation in resin flow property suited to the constant-speed injection process.

A method of controlling a fluctuation in resin flow property in an injection molding machine according to the present invention comprises a step of measuring a maximum value of actual injection pressure in a molding cycle of an injection molding machine, a step of obtaining a degree of fluctuation in the maximum value of the measured actual injection pressure with respect to a maximum value of standard injection pressure, a step of judging whether the degree of fluctuation obtained exceeds a predetermined value, and a step of controlling resin temperature so that the maximum value of actual injection pressure will approach the maximum value of standard injection pressure if the degree of fluctuation obtained exceeds the predetermined value.

An apparatus for controlling a fluctuation in resin flow property in an injection molding machine according to the present invention comprises an injection-pressure sensor for sensing injection pressure of the injection molding machine and outputting a signal representing the injection pressure, injection-pressure maximum-value measuring means for measuring a maximum value of actual injection pressure in a molding cycle of the injection molding machine based upon an output signal from the injection-pressure sensor, heating means for heating resin within the injection molding machine, temperature measuring means for measuring the temperature of the resin within the injection molding machine, means for obtaining a degree of fluctuation in the maximum value of the actual injection pressure, which has been measured by the injection-pressure maximum-value measuring means, with respect to a maximum value of a standard injection pressure, and judging whether the degree of fluctuation is outside a predetermined range, and temperature control means for controlling the heating means, using the resin temperature measured by the temperature measuring means as well as the relationship between the maximum value of injection pressure and the resin temperature, so that the maximum value of actual injection pressure will become equal to the maximum value of standard injection pressure when the judging means has judged that the degree of fluctuation is outside the predetermined range.

In accordance with the present invention, the injection pressure actually applied to the resin in an injection molding machine is sensed and the maximum value of the injection pressure is sensed. The maximum value of actual injection pressure reflects the actual flow property of the resin. The maximum value of injection pressure is low when the flowability of the molten resin is high and high when the resin flowability is low. The flowability of the resin has a great effect upon the quality (dimensions, weight, warpage, etc.) of the molded articles.

In accordance with the present invention, control is performed in such a manner that the resin temperature is made relatively low to diminish resin flowability in relative terms when the maximum value of injection pressure has become somewhat low in comparison with the maximum value of the standard injection pressure. Conversely, control is performed to raise the resin temperature if the maximum value of injection pressure has risen. As a result of such control, the maximum value of injection pressure (i.e., resin flowability) is maintained substantially constant at all times. The maximum value of standard injection pressure mentioned here refers to the maximum value of injection pressure measured under molding conditions in which molded articles exhibiting excellent quality are obtained. Accordingly, molded articles of excellent quality are obtained at all times even if there is a fluctuation in the properties of the resin.

The present invention provides a method and apparatus for measuring injection time from sensed injection pressure.

A method of measuring injection time in an injection molding machine according to the present invention comprises a step of sampling a signal representing injection pressure outputted by an injection-pressure sensor, from a moment immediately preceding start of an injection step of a molding cycle and over a range of time which exceeds likely injection time, a step of detecting a rise in injection-pressure data obtained by sampling and judging that a point in time corresponding to the rise is injection starting time, a step of detecting a peak value of the injection-pressure data with the exception of a peak of the injection-pressure data which may appear immediately after the injection starting time, and judging that a point in time corresponding to the peak value is injection end time, and a step of calculating, as injection time, a period of time from the injection starting time up to injection end time that have been judged.

An apparatus for measuring injection time in an injection molding machine according to the present invention comprises an injection-pressure sensor for sensing injection pressure of the injection molding machine and outputting a signal representing the injection pressure, sampling means for sampling an output signal of the injection-pressure sensor from a moment immediately preceding start of an injection step of a molding cycle and over a range of time which exceeds likely injection time, rise detecting means for detecting a rise in injection-pressure data obtained by the sampling means, peak detecting means for masking data which immediately follows the rise in the injection-pressure data obtained by the sampling means, and detecting a peak value of the injection-pressure data which appears in a latter half of likely injection time, and means for calculating, as injection time, a period of time from a point in time corresponding to the rise detected by the rise detecting means up to a point in time corresponding to the peak value detected by the peak detecting means.

In an embodiment of the present invention, the injection-pressure data obtained by sampling is temporarily stored in a memory in accordance with a sampling sequence, and rise detection processing and peak-value detection processing are executed while the injection-pressure data is being read out of the memory in accordance with the sampling sequence.

When the injection-pressure waveform is closely observed in the constant-pressure injection process, it is seen that the injection pressure rises sharply at the beginning of the injection time period, exhibits a first peak at the end of the rise, and subsequently exhibits a small, pointed second peak at a point in time at the end of the injection time period. Depending upon the rise in the injection pressure, there are instances where the first peak does not appear. The present invention detects the start of the injection time period based upon the rise in the injection pressure, and detects the end of the injection time period by detecting the second peak but excluding the first peak, the appearance of which is possible.

Thus, since the starting point and end point of the injection time period are determined by rise detection and peak detection, it is possible to detect injection time accurately with excellent reproducibility.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2a and 2b are graphs showing a change in injection pressure in an injection molding process with the passage of time, in which FIG. 2a shows a constant-pressure injection process and FIG. 2b a constant-speed injection process;

FIG. 15 is a graph showing how resin temperature control is carried out for the constant-speed injection process;

DESCRIPTION OF THE PREFERRED EMBODIMENT (1) Injection Molding Machine and Apparatus for Controlling the Same FIG. 1 illustrates the general configuration of an injection molding machine and an apparatus for controlling the molding machine.

Figure 1:
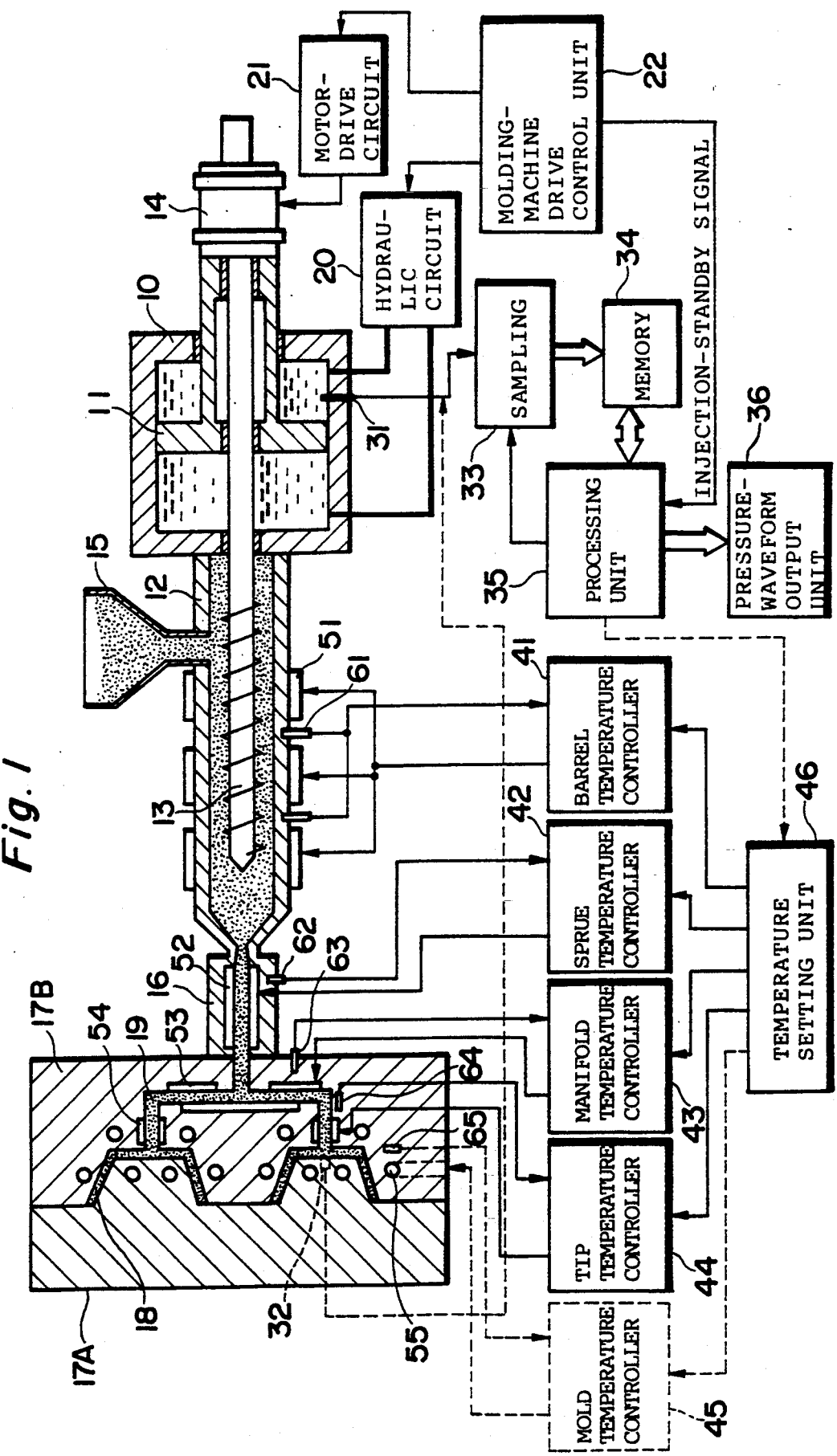
FIG. 1 is a diagram illustrating the construction of an injection molding machine and an apparatus for controlling the same.

A barrel 12 is supplied with a resin material from a hopper 15. A screw 13 arranged in the barrel 12, is freely rotatably supported on a piston 11 within a cylinder 10 and moves back and forth within the barrel 12 along with the piston 11. The screw 13 is driven rotatively by a motor 14 secured to a rod portion of the piston 11 projecting to the exterior of the cylinder 10. Barrel heaters 51 are provided on the periphery of the barrel 12 so that a resin material within the barrel 12 is heated. The resin material inside the barrel 12 is melted due to the heating by the heaters 51 and the rotation of the screw 13.

The piston 11 is moved back and forth within the cylinder 10 by hydraulic pressure supplied from a hydraulic circuit 20. The motor 14 is driven rotatively by a motor drive circuit 21. The screw 13 is retracted to a predetermined position while being rotated and then is advanced without being rotated to force the molten resin within the barrel 12 out of the tip of the barrel. As a result, a single injection molding cycle (one shot) ends and the screw 13is then retracted again while being rotated. A molding-machine drive control unit 22 controls the hydraulic circuit 20 and motor drive circuit 21 in such a manner that this repetitive operation of the molding machine is performed stably in highly precise fashion. The control unit 22 controlling the repetitive operation of the molding machine and the drive system is well known.

The molten resin forced out of the barrel 12 by the screw 13 is supplied to a manifold 19 in a mold 17B through a sprue (an extended nozzle) 16 placed on the tip of the barrel 12, and the molten resin supplied fills a cavity 18 formed by molds 17A and 17B.

The control apparatus for controlling a fluctuation in resin flow property in the injection molding machine includes an injection hydraulic-pressure sensor 31, which is provided in the injection cylinder 10 or hydraulic circuit 20. In this embodiment, the pressure sensed by the injection hydraulic-pressure sensor 31 shall be referred to as injection pressure. The injection pressure can be sensed also using an internal pressure sensor 32 that directly senses the pressure of the resin charged into the cavity 18 of the molds 17A, 17B, as indicated by dashed lines.

A signal representing the injection pressure outputted by the pressure sensor 31 or 32 is sampled in a sampling circuit 33 at a fixed period (e.g., 1 msec), and the signal is converted into a digital data that is then stored temporarily in a memory 34. A processing unit 35, which includes a CPU and its peripheral circuits, measures the maximum value of injection time or injection pressure, in a manner described later in greater detail, based upon the injection-pressure data stored in the memory 34. The injection-pressure waveform represented by the injection-pressure data is outputted from a pressure-waveform output unit 36 in the form of visible information. The pressure-waveform output unit 36 may be a printer, a display device, etc.

The control apparatus for controlling a fluctuation in resin flow property in the injection molding machine further includes the barrel heaters 51, a sprue heater 52, a manifold heater 53, a tip heater 54, a barrel temperature sensor 61, a sprue temperature sensor 62, a manifold heat sensor 63 and a tip temperature sensor 64. The barrel heater 51 heats the resin inside the barrel 12, as described above, and the temperature of the molten resin in the barrel 12 is sensed by the barrel temperature sensor 61. The sprue heater 52 maintains the temperature of the molten resin inside the sprue 16, and this temperature is sensed by the sprue temperature sensor 62. The manifold heater 53 maintains the temperature of the molten resin inside the manifold 19 of the mold 17B and controls the flow rate of the molten resin to the cavity 18. The temperature of the molten resin in the manifold is sensed by the manifold temperature sensor 63. The heater 54 disposed at the tip of the manifold 19 shall be referred to as a tip heater in this specification. The tip heater 54 maintains the temperature of the molten resin, controls the flow rate of the molten resin and controls the finish of the gate of a molded article. The temperature of the tip heater is sensed by the tip temperature sensor 64.

In order to control the heating of the heaters 51, 52, 53 and 54, there are provided a barrel temperature controller 41, a sprue temperature controller 42, a manifold temperature controller 43, a tip temperature controller 44 and a temperature setting unit 46. The temperature setting unit 46 individually sets the barrel setting temperature, the sprue setting temperature, the manifold setting temperature and the tip setting temperature. The barrel-temperature controller 41 controls the supply of current to the barrel heater 51 in such a manner that the barrel temperature sensed by the barrel temperature sensor 61 will become equal to the barrel setting temperature see in the temperature setting unit 46. Similarly, the sprue temperature controller 42, manifold temperature controller 43 and tip temperature controller 44 control the supply of current to the sprue heater 52, manifold heater 53 and tip heater 54, respectively, in such a manner that the temperatures sensed by the sprue temperature sensor 62, manifold temperature sensor 63 and tip temperature sensor 64 will become equal to the corresponding set temperatures set in the temperature setting unit 46.

If necessary, the the mold setting temperature can be set in the temperature setting unit 46. The temperature or flow rate of a coolant which flows in a mold coolant pipe 55 provided in the molds 17A, 17B is controlled by a mold temperature controller 45 in such a manner that the mold temperature sensed by a mold temperature sensor 65 disposed within the mold will become equal to the mold setting temperature.

(2) Constant-Pressure Injection Process and Constant-Speed Injection Process

The injection molding process in an injection molding machine can be considered as being divided into an injection stage of filling the interior of a mold cavity with a molten resin at high pressure, a dwell stage for preventing a situation in which a desired shape fails to be obtained because of a gap which forms between the mold and the injected resin owing to shrinkage of the resin within the mold, this stage involving the application of pressure so as to cause the resin to flow into the gap after injection, and a cooling stage for cooling the resin without applying pressure down to a temperature at which the molded article can be extracted.

Figure 2A:
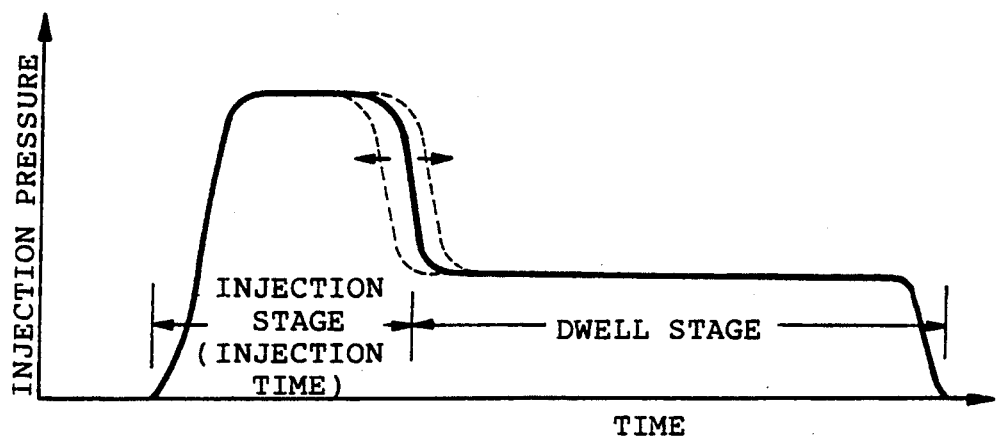
Figure 2B:
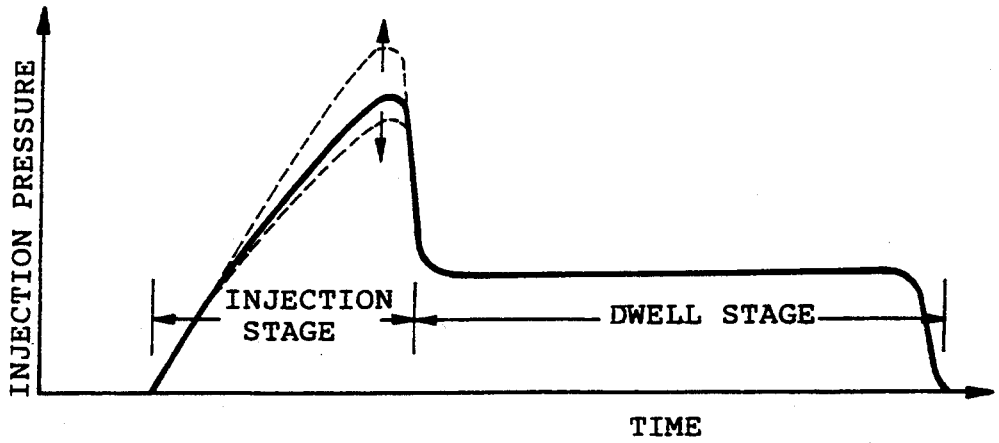

As a result of closely observing the change in injection pressure with time in the injection molding process in relation to articles of a variety of shapes and sizes, the inventor has found that such change can be broadly classified into two patterns, as depicted in FIGS. 2a and 2b. FIGS. 2a and 2b typically represent a change in injection pressure with time in order to directly express the features of the two patterns.

In the injection molding process illustrated in FIG. 2a, injection pressure is maintained substantially constant in the injection stage. Accordingly, the process is referred to as a constant-pressure injection process.

In the constant-pressure injection process, the time period of the injection stage (which time period shall be referred to as the "injection time") fluctuates, as indicated by the dashed line, owing to a fluctuation in the properties (mainly the flowability) of the molten resin. The injection time is short when the flowability of the molten resin is high and long when the resin flowability is low. When injection time varies, there is a change in the state of development of a solidification layer when the molten resin fills the interior of the mold cavity, as a result of which a variation occurs in the filling state of the resin, as will be described later in greater detail. This variation has a great effect upon the quality (weight and dimensions, etc.) of the molded articles. In order to reduce or eliminate this disparity in the quality of the articles, it is required that the injection time be held constant.

In the injection molding process illustrated in FIG. 2b, injection speed is maintained substantially constant in the injection stage. Accordingly, the process is referred to as a constant-speed injection process.

In the constant-speed injection process, the maximum value of injection pressure in the injection stage fluctuates, as indicated by the dashed line, owing to a fluctuation in the properties (mainly the flowability) of the molten resin. The maximum value of injection pressure is small when the flowability of the molten resin is high and large when the resin flowability is low. When the maximum value of injection pressure varies, there is a change in the density of the resin introduced and a fluctuation in the quality (weight and dimensions, etc.) of the molded articles. In order to suppress or eliminate this disparity in the quality of the articles, it is required that the maximum value of injection pressure be held constant.

In general, the constant-pressure injection process tends to appear in cases where an article of small thickness or an article of large size is molded. In such cases, injection molding often is carried out at maximum injection pressure decided by the capability of the injection molding machine. That is, injection pressure in the injection stage is maintained at the maximum injection pressure. The constant-speed injection process, on the other hand, appears in cases where an article of a relatively small size is molded. The maximum value of injection pressure in the injection stage generally is smaller than the maximum injection pressure decided by the capability of the injection molding machine.

When the resin material for injection molding is produced in batches, the properties of the resin differ from one batch to another. A large number of identical articles are molded by the same mold using resin whose properties differ (naturally the disparity only slight), as when the resin is produced in different batches. At this time the injection-pressure waveform of every injection molding cycle (process) is measured. By observing a large number of injection-pressure waveforms that have been obtained, it is determined whether there is a fluctuation in injection time or a fluctuation in the maximum value of injection pressure in the injection stage. If there is a fluctuation in injection time, it is judged that the process is the constant-pressure injection process. If there is a fluctuation in the maximum value of injection pressure, it is judged that the process is the constant-speed injection process.

It goes without saying that an arrangement may be adopted in which the above-mentioned judgment is made by measuring the injection time and the maximum value of injection pressure instead of measuring the injection-pressure waveform.

Figure 3:
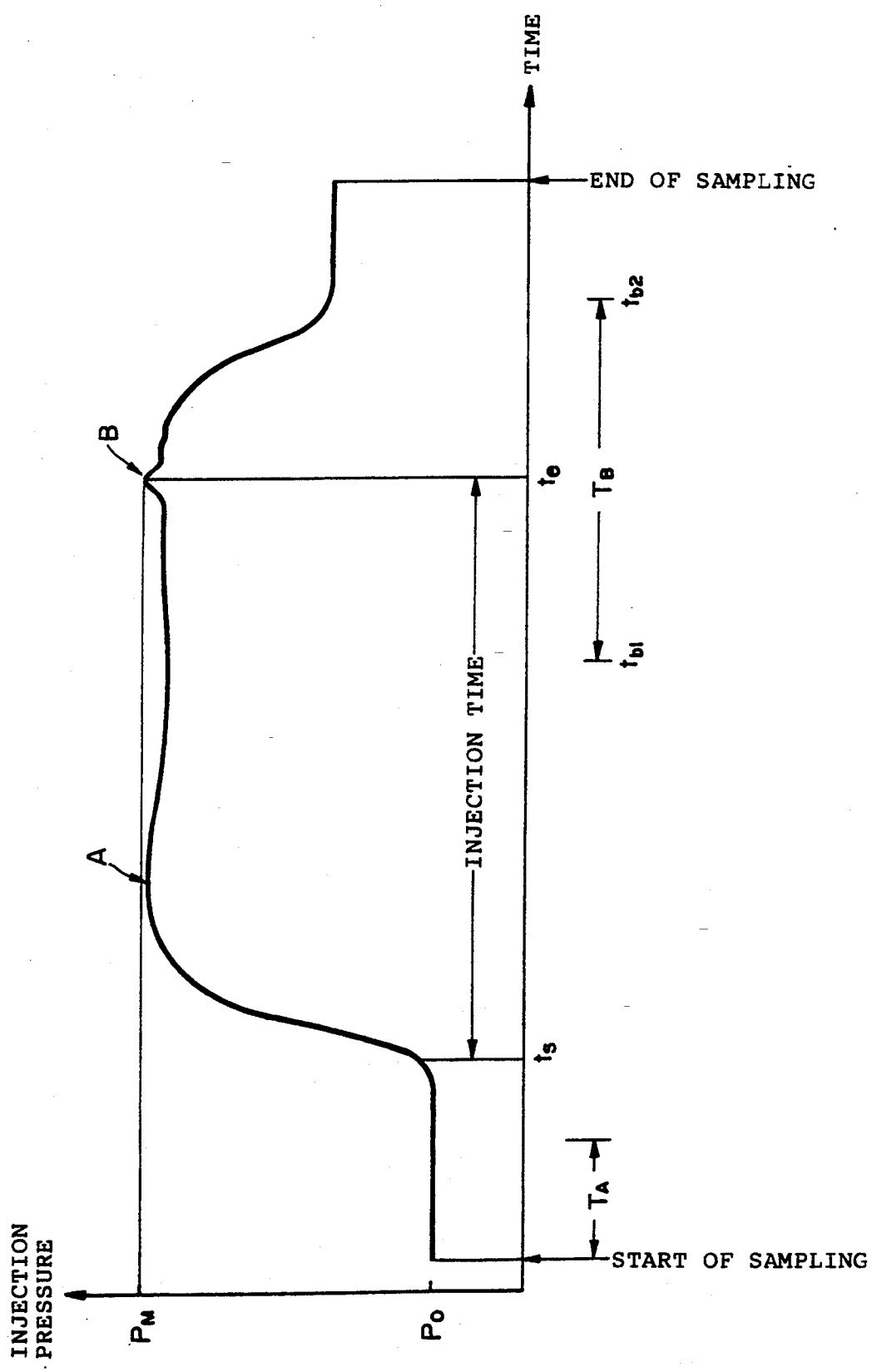
FIG. 3 is a graph showing an example of an injection-pressure waveform obtained from a pressure sensor in the constant-pressure injection process.

(3) Measuring Injection-Pressure Waveform, Injection Time and Maximum Value of Injection Pressure FIG. 3 illustrates an example of an injection-pressure waveform actually obtained from the pressure sensor 31 in the constant-pressure injection process.

The output signal of the pressure sensor 31 indicates a substantially constant initial pressure prior to the start of the injection stage of the injection molding cycle.

When the injection stage begins, the injection-pressure indicated by the output signal of the pressure sensor 31 rises sharply and then is held substantially constant during the injection stage. A close investigation of the injection pressure in the injection stage reveals that a smooth first peak A appears near the end of the rise of the injection pressure, followed by a sharp second peak B which appears at the end of the injection stage. It seems that the second peak B is the result of a counter-reaction caused by the resin filling the mold cavity.

In this section [namely section (3)], the time from a moment $t_s$ at which the injection pressure starts rising from the initial pressure to a moment $t_e$ at which the second peak B appears is defined as injection time in the constant-pressure injection process.

Defining injection time as the period from time $t_s$ at which the injection-pressure waveform starts rising to a time $t_e$ at which the second peak B appears has several advantages.

The first advantage is that detecting these points in time $t_s$, $t_e$ is easy. The time $t_s$ is the moment at which the pressure rises sharply from the initial pressure, which is held substantially at a constant value. The point in time can be readily detected by comparison processing. It is possible to readily detect the second peak B by maximum-value detection processing if only the first peak A is excluded.

The second advantage is that the injection-pressure waveform faithfully expresses the properties of the resin since the pressure actually applied to the resin within the injection molding machine is sensed. It is possible to obtain the injection time by extracting command signals, such as commands for starting injection pressurization, dwell and the like, outputted by the drive-system control unit 22 of the molding machine and applied to the hydraulic circuit 20. However, there is a considerably large delay, which is attributable to the hydraulic circuit 20, between the moment at which the various commands applied from the control unit 22 to the hydraulic circuit 20 are outputted and the moment at which pressure is actually applied to the resin or at which applied pressure declines. In addition, this delay is not constant. Accordingly, in accordance with the latter method, the change in pressure actually applied to the resin cannot be sensed faithfully.

It is of course possible to define the injection time as the period from the moment at which the pressurization-start command from the control circuit 22 is outputted to the moment at which the dwell-start command from the control circuit is outputted. The injection time can also be defined as the period from the moment at which the output waveform actually applied to the resin rise to the moment at which the output waveform decays, as shown in FIG. 3. The discussion in section (2) above and a discussion in section (4) described below hold true even if injection times defined by various definitions such as those given above are used in addition to the definition of this section.

A period during which the output signal of the pressure sensor 31 is sampled is set so as to include the injection time as well as each part of the period of initial pressure and the dwelling time that come before and after the injection time. A time period $T_A$ for calculating an average value $P_0$ of initial pressure is set beforehand in part of the period of initial pressure within the sampling period. The period $T_A$ is selected so as not to include the injection starting time $t_s$. A time period $T_B$ for detecting the second peak B (the injection end time $t_e$) is set beforehand in the vicinity of the end point of the injection time period. In consideration of the fluctuation in injection time, the period $T_B$ is determined in such a manner that all possible injection end times will be included in its range without inclusion of the first peak A. Since injection time is more or less decided by such factors as the type of article to be injection molded and the type of resin used, it is possible to set the time period $T_B$ of the kind mentioned above. The time period $T_B$ is stipulated by a point $t_{b1}$ at the beginning thereof and a point $t_{b2}$ at the end thereof. Alternatively, it is possible to set the time period $T_B$ also by setting an appropriate length of time centered on the injection end point of a standard injection time.

Figure 4:
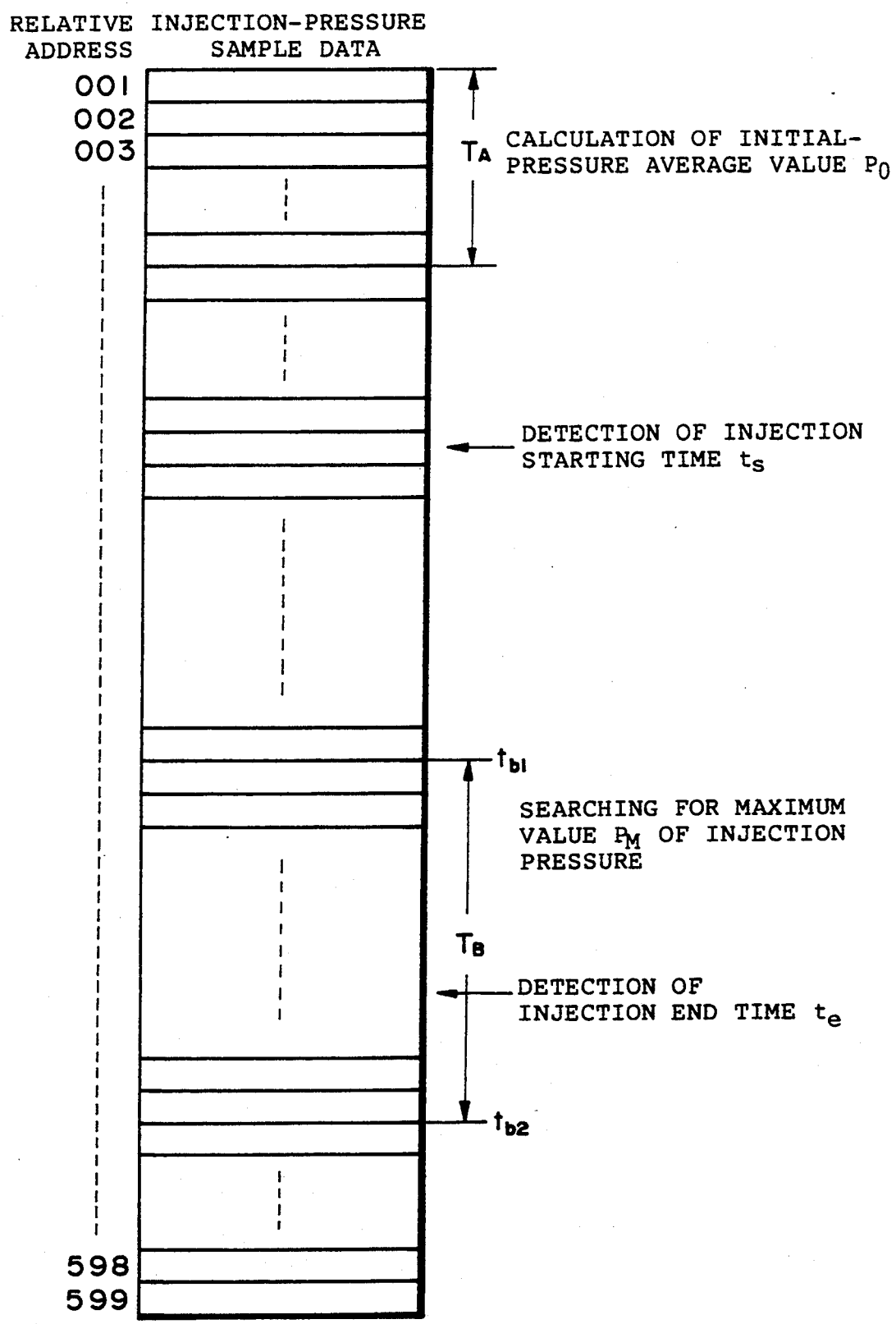
FIG. 4 is a memory map illustrating the structure of a memory.

FIG. 4 illustrates the structure of the memory 34. The memory 34 has a large number of storage locations to which relative addresses are allocated using consecutive numbers. Each storage location stores an item of sample data. The sample data is stored in the storage locations of the memory 34 in such a manner that the sequence of sampling performed by the sampling circuit 33 and the sequence of the relative addresses of the memory 34 coincide. Accordingly, the sampling timing of the sample data that has been stored at the storage locations of the relative addresses can be calculated using these relative addresses. For instance, sampling is performed 600 times over 0.6 sec at a sampling period of 1 msec. As one example, the standard injection time is in the vicinity of 0.27 sec, and injection time fluctuates by ±0.03 sec about this value.

Figure 5:
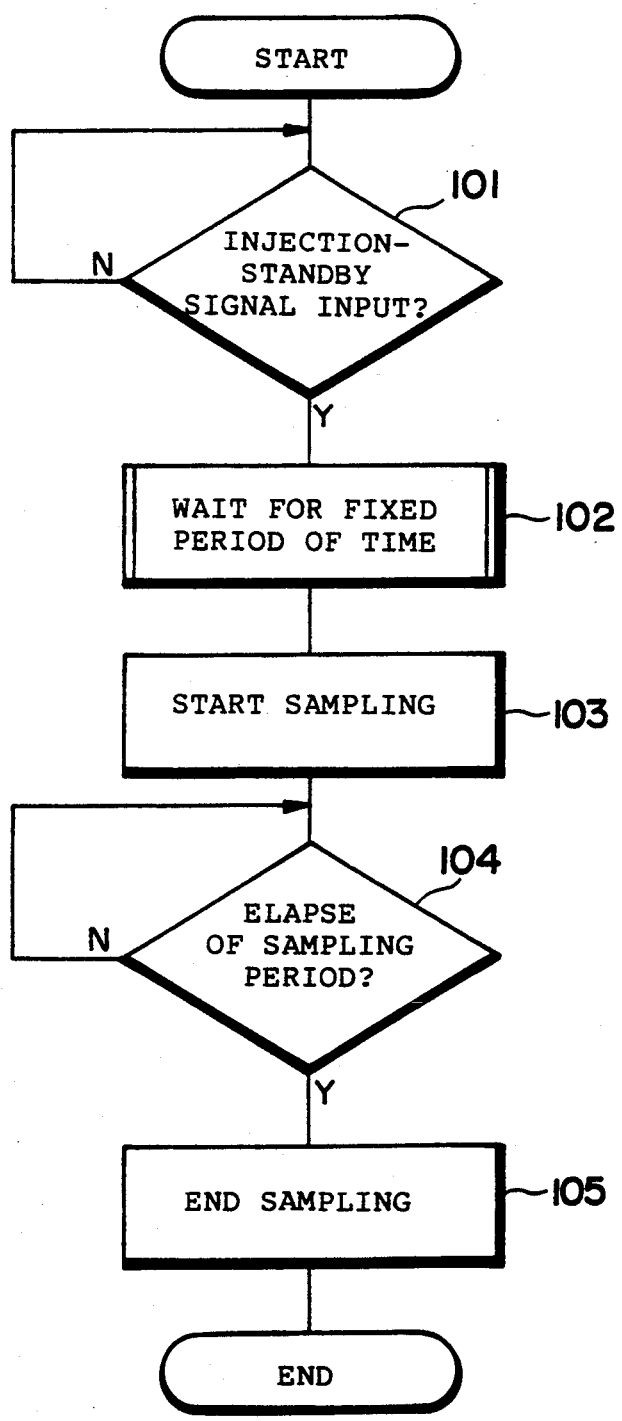
FIG. 5 is a flowchart illustrating a processing procedure for controlling the sampling operation of a sampling circuit.

FIG. 5 illustrates one example of a processing procedure for controlling the sampling operation of the sampling circuit 33 by the CPU incorporated in the processing unit 35.

The control unit 22 for molding-machine drive system outputs an injection-standby signal at a point in time at the beginning of the injection molding cycle. The injection-standby signal is applied to the processing unit 35. The period of time from the moment at which the injection-standby signal is generated to the moment at which the pressurizing operation of the hydraulic circuit 20 begins includes a waiting time and a delay time. It will suffice if the sampling of the output signal of the pressure sensor 31 by the smapling circuit 33 begins immediately before the pressurizing operation performed by the hydraulic circuit 20 (of course, it is necessary to allow for the time period $T_A$). Therefore, sampling starts a fixed period of time after the moment at which the injection-standby signal is generated.

When the injection-standby signal is provided by the control unit 22 (step 101), the CPU of the processing unit 35 waits for passage of the above-mentioned fixed time (step 102) and provides the sampling circuit 33 with a sampling-start command (step 103). As a result, the sampling circuit 33 samples the signal, which is provided by the pressure sensor 31, at a fixed sampling period and converts the signal into digital data before output. The sample data representing pressure is applied to the memory 34 in the order sampled, and the data is stored successively at the storage locations of the memory in the order of the locations.

When the sampling time (0.6 sec in the above-mentioned example) elapses (step 104), the CPU of the processing unit 35 provides the sampling circuit 33 with a sampling-end command (step 105), in response to which the sampling circuit 33 terminates the sampling operation.

It is also possible for an interrupt to be applied to the CPU of processing unit 35 by the injection-standby signal of step 101 so that the processing shown in FIG. 5 can be started in response to the interrupt signal. In addition, an arrangement can be adopted in which the timekeeping processing of steps 102 and 104 is executed using a timer and the CPU is interrupted in response to a time-up signal from this timer. Furthermore, the software processing shown in FIG. 5 and the software processing shown in FIG. 6, described below, can be implemented by hardware circuitry as well.

The pressure data equivalent to one shot thus stored in the memory 34 can be outputted by the pressure-waveform output unit 36 via the processing unit 35. A pressure waveform of the kind shown in FIG. 3 is printed out or displayed by the pressure-waveform output unit 36. The operator is capable of reading the injection time or injection pressure from the pressure waveform thus outputted.

Figure 6:
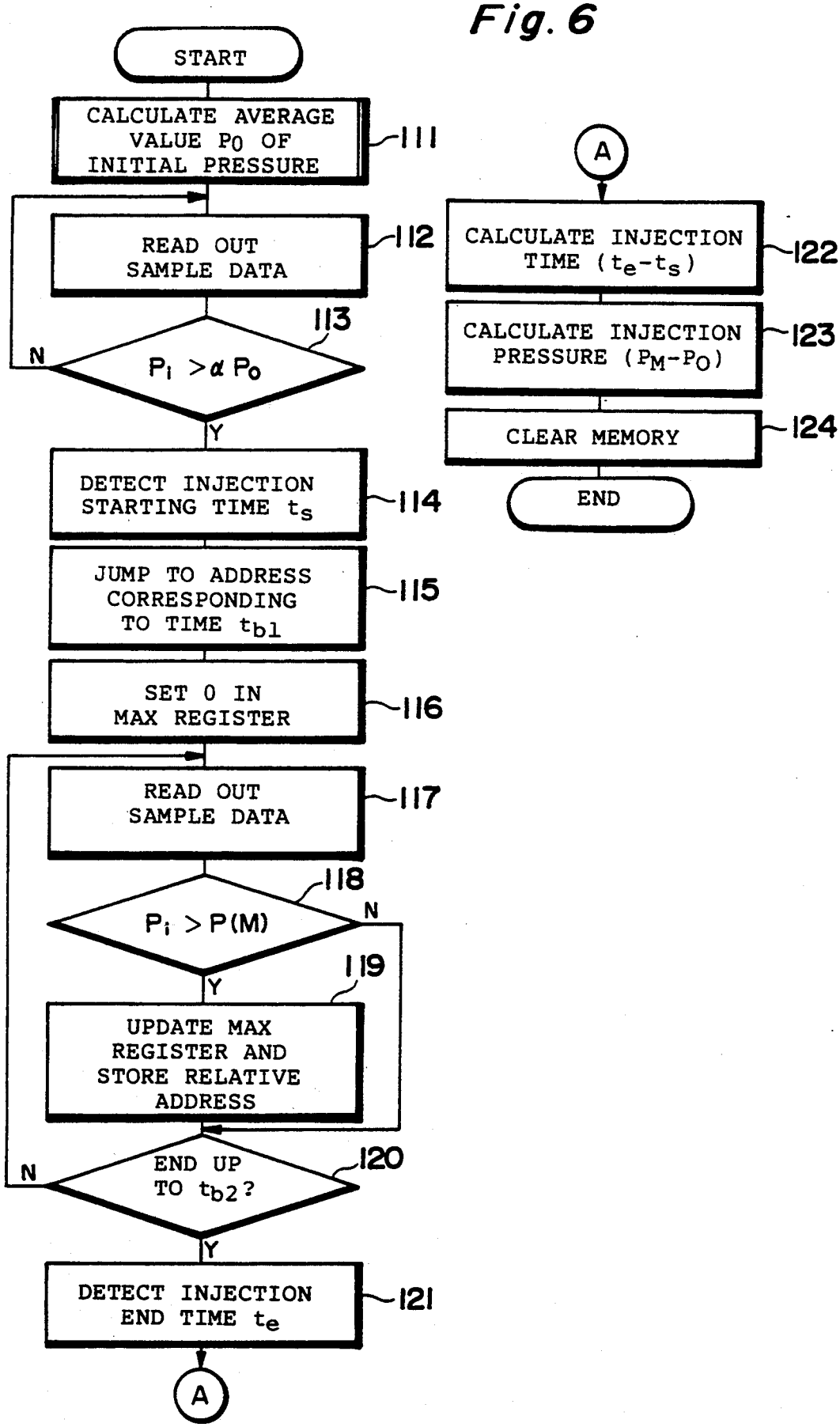
FIG. 6 is a flowchart illustrating a processing procedure for measuring injection time and injection pressure.

FIG. 6 illustrates an example of a processing procedure through which the CPU of the processing unit 35 measures injection time and injection pressure using the sample data stored in the memory 34.

The sample data belonging to the time period $T_A$ is read out of memory 34 and the average value thereof is calculated (step 111). The calculated average value is the average value $P_0$ of initial pressure.

Next, sample data $P_i$ which follows the time period $T_A$ is read out in the order of sampling (the order of the addresses) and this data is successively compared with the average value $P_0$. When sample data $P_i$ having a value slightly larger than the average value $P_0$ is detected (step 113), it is judged that the point in time corresponding to the sample data $P_i$ is the injection starting time $t_s$ (step 114). More specifically, sample data which satisfies the inequality $P_i > \alpha P_0$, where $\alpha$ is a value on the order of 1.01, is searched successively in the order of the addresses.

The average value $P_0$ is calculated as initial pressure, and the average value $P_0$ is compared with the sample data. Accordingly, even though the initial-pressure data contains some noise components, accurate detection of the injection starting time is possible since averaging is performed. The above-mentioned coefficient $\alpha$ may be decided upon taking into account the pressure difference produced during the sampling period (1 msec) in the vicinity of the rise in injection pressure, the magnitude of the noise, etc.

After the injection starting time $t_s$ has been detected, the program proceeds to processing for detecting the second peak B. The address of the sample data to be read out of the memory 34 jumps to an address corresponding to the starting time $t_{b1}$ of the time period $T_B$ (step 115). As a result, the sample data from time $t_s$ to time $t_{b1}$ is ignored. The first peak A resides in the interval of time. By ignoring the sample data representing the first peak A, it is possible to prevent the time of the first peak from being sensed erroneously as the injection end time.

The processing unit 35 is provided with a MAX register which stores sample data representing the maximum value of pressure at each point in time of the processing, and an address memory area which stores relative addresses in the memory 34 of the sample data stored in the MAX register. Of course, the MAX register and the address memory area may be realized using a predetermined storage location within the memory 34.

At the start of processing for detecting the second peak B, the minimum value, e.g., 0, is set in the MAX register (step 116). The sample data $P_i$ is read out (step 117) in accordance with the order of the addresses in the address region of memory 34 that corresponds to the time period $T_B$, and the sample data $P_i$ is successively compared with data P(M) that has been stored in the MAX register. If the inequality $P_i > P(M)$ is satisfied (step 118), the sample data $P_i$ is stored in the MAX register, whereby the content of the MAX register is updated, and the address of this sample data $P_i$ is stored in the address memory (step 119). If the relation $P_i \leq P(M)$ holds, the processing of step 119 is skipped.

The above-mentioned processing continues (step 120), while addresses are successively updated, until the end of the sample data at the address corresponding to time $t_{b2}$. By virtue of this processing, the maximum value (the value of the second peak B) of the injection pressure in the time period $T_B$ is stored in the MAX register, and the address of the storage location of memory 34 at which this maximum value is stored is stored in the address memory area. The point of time corresponding to the address of the address memory area is the injection end time $t_e$ (step 121).

The difference between the injection starting time $t_s$ and injection end time $t_e$ thus obtained, namely $t_e-t_s$, is calculated as the injection time (step 122). The difference $P_M-P_0$ between the average value $P_0$ of initial pressure and the maximum value $P_M$ of pressure stored in the MAX register is calculated as the injection pressure (step 123). Finally, the memory 34 is cleared (step 124) for the sake of measurement processing in the next injection cycle.

The pressure value of the second peak B of injection pressure is approximately equal to the maximum injection pressure decided by the capability of the injection molding machine. In reality, therefore, other than the peak B, a value larger than the maximum injection pressure is impossible to obtain. If the sample data should happen to indicate a value larger than the maximum injection pressure, this will be due to noise. Accordingly, when the condition $P_i>P(M)$ is satisfied in the processing for detecting the second peak B, it is determined whether the sample data $P_i$ is greater than the maximum injection pressure. If it is greater, the processing for updating the MAX register and the address memory area is skipped, as a result of which erroneous detection due to introduction of noise is excluded.

In the description given above, the sample data is stored temporarily in memory, after which processing for detecting injection starting point and injection end point is executed. However, it is also possible for an arrangement to be adopted in which, rather than storing the sample data in memory, detection of each point in time is performed by applying the processing of FIG. 6 to the obtained sample data while the sampling is being carried out. In addition, there are a variety of methods of processing for detecting the moment $t_s$ at which the injection pressure rises and the second peak B (the maximum value) of the injection pressure, and any of these methods can be employed.

The processing shown in FIGS. 5 and 6 can be applied to obtain the maximum value of injection pressure in the constant-speed injection process because the maximum value of injection pressure in the constant-speed injection process also appears at the end of the injection stage and can be detected by maximum-value detection processing in the same manner as the second peak B. The maximum value of injection pressure is obtained as the detected peak pressure $P_M$. Injection pressure $P_M-P_0$ obtained by subtracting the average value $P_0$ of initial pressure from the maximum value $P_M$ may be used as the maximum value of injection pressure.

Figure 7:
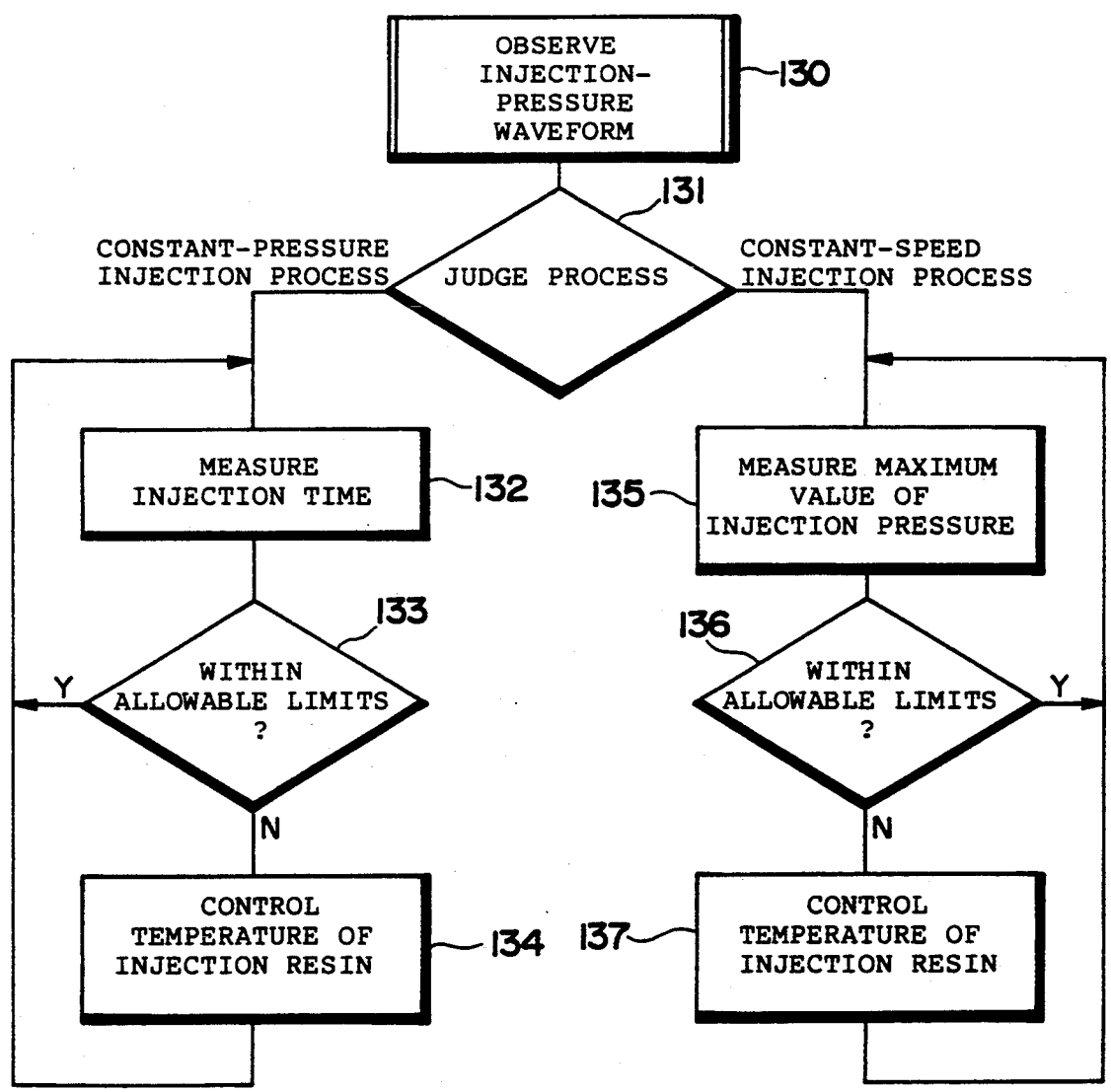
FIG. 7 is a flowchart illustrating the flow of an overall procedure relating to injection-resin temperature control.

(4) Controlling Fluctuation in Resin Flow Property (4-1) Overall flow of control The flow of processing for judgment of the injection process [section (2)] and measurement of injection time or maximum value of injection pressure [section (3)], described thus far, and flow of processing for control of the injection-resin temperature, described in this section, are shown collectively in FIG. 7.

The injection-pressure waveform is observed (step 130) while a large number of identical articles are injection molded by the same mold using resin having slightly different properties. It is determined (step 131) whether the process is the constant-pressure injection process or the constant-speed injection process in accordance with whether there is a fluctuation in injection time or a fluctuation in the maximum value of the injection pressure in a large number of injection-pressure waveforms.

This is carried out over time by a technician, or the processing unit 35 can be adapted to measure the injection time and maximum value of injection pressure and make the determination based thereon.

In a case where the process is judged to be the constant-pressure injection process, the injection time is measured (step 132). In a case where the process is judged to be the constant-speed injection process, the maximum value of injection pressure is measured (step 135). These measurements preferably are executed by the sampling circuit 33, memory 34 and processing unit 35 in the manner described above. The measurement of injection time or maximum value of injection pressure may be carried out every injection molding cycle, at fixed time intervals or in injection molding cycles designated at will by the technician. In any case, it is desired that measurements be performed a plurality of time and the average value of the measurements be taken.

In the constant-pressure injection process, the measured injection time (preferably the average value thereof) is compared with a standard injection time (which will be described later), and it is determined whether the former resides within allowable limits (step 133). If the fluctuation ratio in the injection time relative to the standard injection time is less than, say, ±10%, then it is judged that proper injection molding is being carried out. If the fluctuation ratio in the injection time relative to the standard injection time is equal to or greater than ±10%, then it is judged that the flow property of the resin is fluctuating beyond the allowable limits.

When it has been judged that the measured injection time is outside the allowable limits, the temperature of the molding resin is adjusted, in dependence upon direction and amount of fluctuation in injection time, in such a manner that the injection time will approach the standard injection time (step 134).

The above-mentioned judgment and temperature adjustment may be performed by a technician or automatically by the processing unit 35. The adjustment of temperature is implemented by changing the set temperature in the temperature setting unit 46, by way of example.

If the measured injection time lies within the allowable limits, or, if necessary, after the resin temperature has been adjusted, the procedure proceeds again to measurement of injection time. By repeating steps 132 through 134, the resin flow property is held substantially within fixed limits at all times and the production of articles of excellent quality is assured.

In the constant-speed injection process, the maximum value of measured injection pressure (preferably the average value thereof) is compared with a maximum value of standard injection pressure (which will be described later), and it is determined whether the former resides within allowable limits (step 136). If the fluctuation ratio in the maximum value of measured injection pressure relative to the maximum value of standard injection pressure is less than, say, ±10%, then it is judged that the fluctuation in resin flow property is small and that injection molding is being carried out properly. If the fluctuation ratio is equal to or greater than ±10%, then it is judged that the fluctuation in the flow property of the resin is outside the allowable limits and that the molded articles will be adversely affected.

When it has been judged that the maximum value of measured injection pressure is outside the allowable limits, the temperature of the molding resin is adjusted, in dependence upon direction and amount of fluctuation in the maximum value of injection pressure, in such a manner that the maximum value of injection pressure will approach the maximum value of standard injection pressure (step 137).

The above-mentioned judgment and temperature adjustment may be performed by a technician or automatically by the processing unit 35. The adjustment of temperature is implemented by changing the set temperature in the temperature setting unit 46, by way of example.

If the maximum value of measured injection pressure lies within the allowable limits, or, if necessary, after the resin temperature has been adjusted, the procedure proceeds again to measurement of maximum value of injection pressure. By repeating steps 135 through 137, the fluctuation in resin flow property is held within the minimum limits and the production of articles of excellent quality is assured.

(4-2) Effects of fluctuation in resin flow property upon molded articles

The effects of a fluctuation in injection time upon a molded article in the constant-pressure injection process will now be described.

Figure 8A:
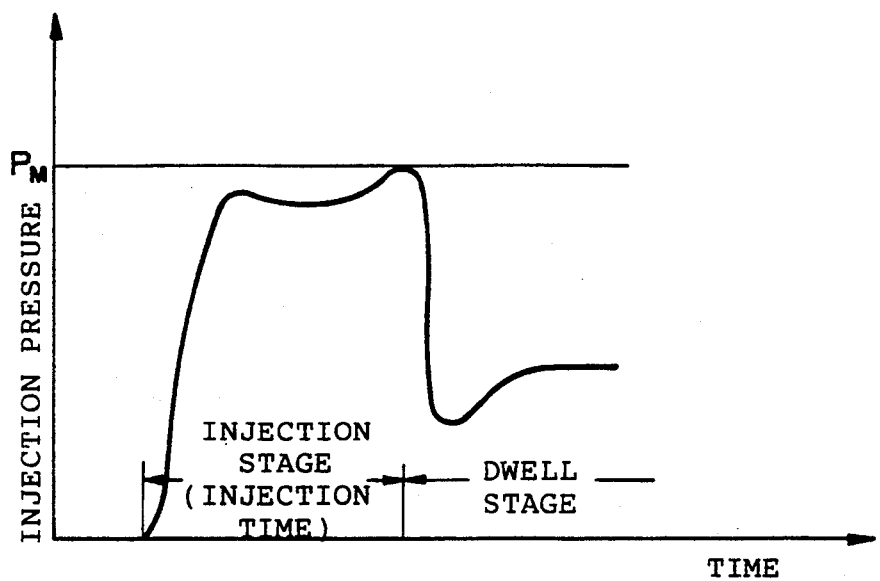
FIGS. 8a and 8b are a graph illustrating a change in injection pressure with time and a sectional view showing the flow of resin within a mold cavity, respectively, in a case where the injection time is relatively short.
Figure 8B:
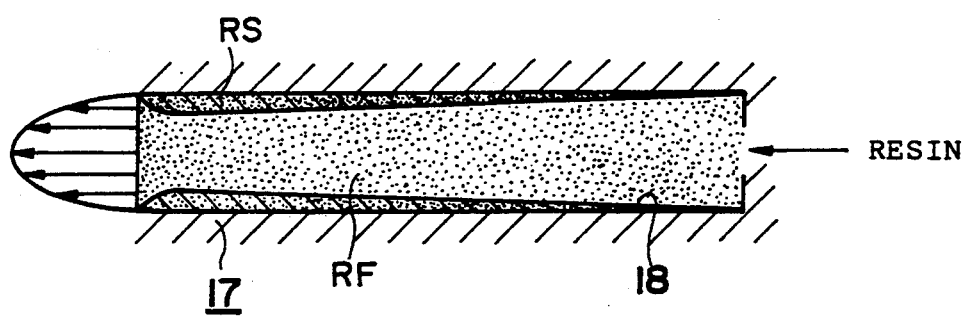

FIGS. 8a and 8b respectively illustrate a change in injection pressure with time and the flow of resin in the cavity of the mold in a case where the injection time is relatively short.

Figure 9A:
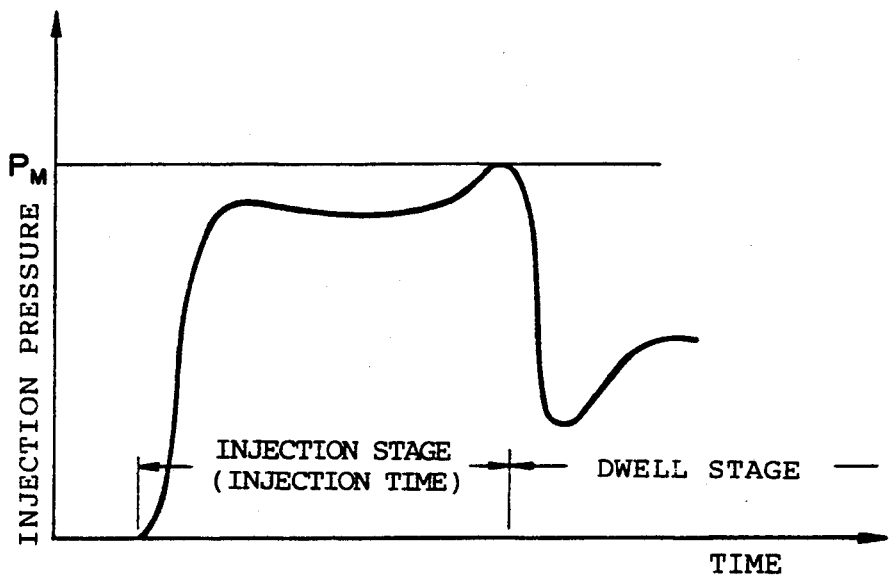
FIGS. 9a and 9b are a graph illustrating a change in injection pressure with time and a sectional view showing the flow of resin within a mold cavity, respectively, in a case where the injection time is relatively long.
Figure 9B:
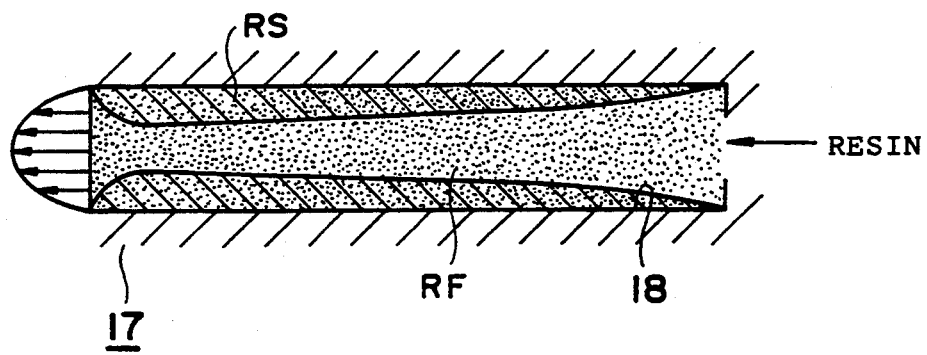

FIGS. 9a and 9b, on the other hand, respectively illustrate a change in injection pressure with time and the flow of resin in the cavity of the mold in a case where the injection time is relatively long.

When molten resin (at a temperature of 120°~300° C.) flows into the cavity 18 of the mold 17, the resin at the interface with the mold starts hardening (hardening temperature: 100°~180° C.) since the mold 17 is comparatively cool (30°~80° C.). In other words, the inflow and hardening of molten resin proceed simultaneously. In FIGS. 8a, 8b, 9a and 9b, hardened resin, namely a hardened layer (a layer which does not flow), is represented by RS, and inflowing molten resin is represented by RF.

As mentioned earlier, injection time is short when the flowability of the resin is high and long when resin flowability is low. When the injection time is short, the thickness of the hardened layer which develops by the time the molten resin flows up to the tip of the cavity 18 is comparatively small, and pressure readily bears upon the molded article up to the terminus thereof since the flow resistance within the cavity is small.

Figure 10:
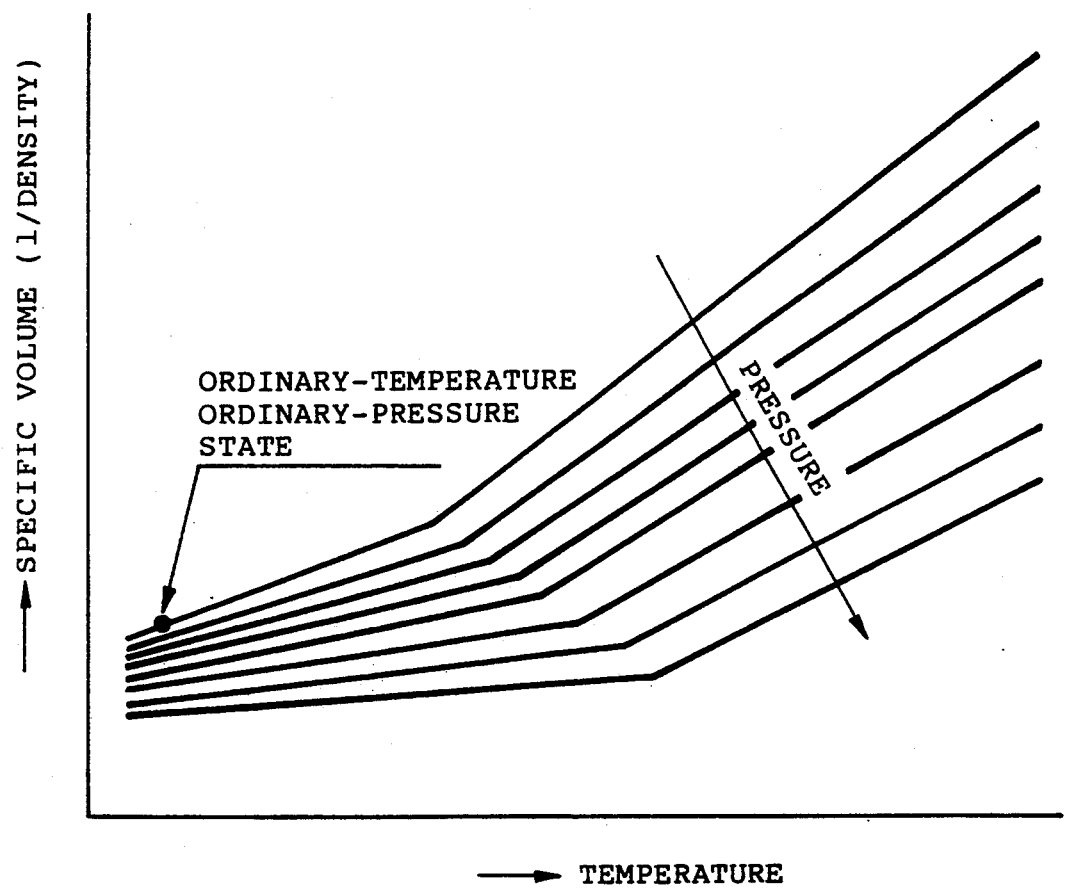
FIG. 10 is a graph showing the relationship between resin temperature and specific volume, with pressure serving as a parameter.

FIG. 10 illustrates the relationship between resin temperature and specific volume (the reciprocal of density), in which pressure is a parameter. When pressure is high, the specific volume (=1/density) is small and the molded article is heavy. Since the difference in specific volume relative to the specific volume which prevails under ordinary temperature and pressure is small, the post-shrinkage factor of the resin after extraction from the mold is small and the dimensions of the molded article are comparatively large. If injection time is long, results which are the opposite of the foregoing are produced.

The effects of a fluctuation in the maximum value of injection pressure upon a molded article in the constant-speed injection process will now be described.

The maximum value of injection pressure is small when the flowability of the resin is high and large when resin flowability is low. When the injection pressure is low, the specific volume (=1/density) is large and the molded article is light, as indicated in FIG. 10. Since the difference in specific volume relative to the specific volume which prevails under ordinary temperature and pressure is large, the post-shrinkage factor of the resin after extraction from the mold is large and the dimensions of the molded article are comparatively small. If injection pressure is high, results which are the opposite of the foregoing are obtained.

(4-3) Deciding standard injection time and maximum value of standard injection pressure A method of deciding standard injection time in the constant-pressure injection process will now be described.

Figure 11:
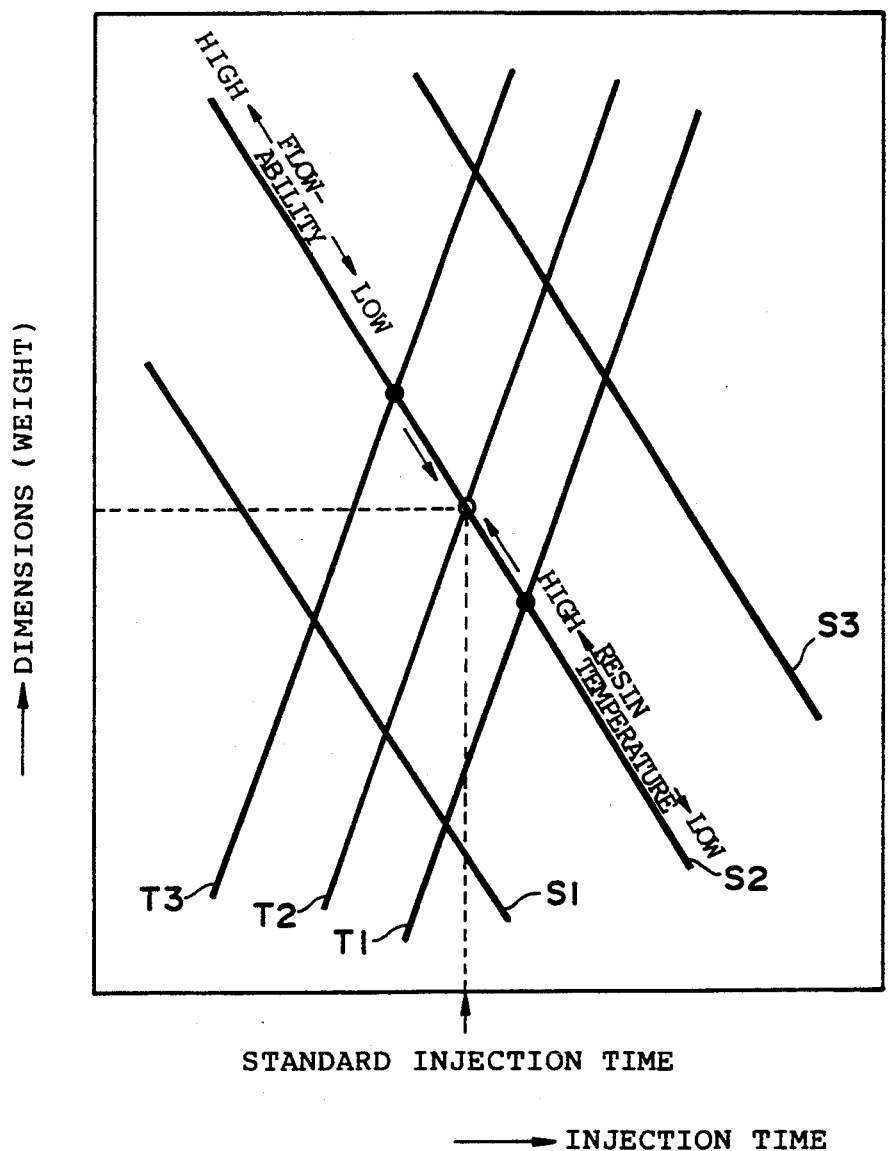
FIG. 11 is a diagram of molding state in the constant-pressure injection process.

FIG. 11 is a diagram of molding state in the constant-pressure injection process. Injection time is plotted along the horizontal axis and dimensions (weight) of the molded article along the vertical axis. The parameters are shot size (amount of stroke of the screw in a single molding process, which stroke usually is measured by the position of the screw prior to injection) and resin temperature. The relationship S3>S2>S1 holds with regard to shot size, and the relationship T3>T2>T1 holds with regard to temperature.

When the resin temperature is changed, the molding state moves along the lines slanting downwardly to the right (upwardly to the left). The flowability of the resin, which differs depending upon the resin temperature, rises when temperature rises. When the shot size is changed, the molding state moves along the lines slanting upwardly to the right (downwardly to the left).

A trial run of injection molding is performed under molding conditions at a large number of points on the molding-state diagram while the resin temperature and shot size are thus changed. The dimensions, weight and warpage (flatness) of molded articles thus obtained are measured or examined and the best molded article is selected. The molding conditions of the best molded article are adopted as a standard state, and the injection time which prevails in such case is adopted as the standard injection time.

Though resin temperature and shot size are mentioned as molding conditions for the sake of simplicity, it goes without saying that molding conditions include many other factors and the trial molding may be performed while changing these factors.

Figure 12:
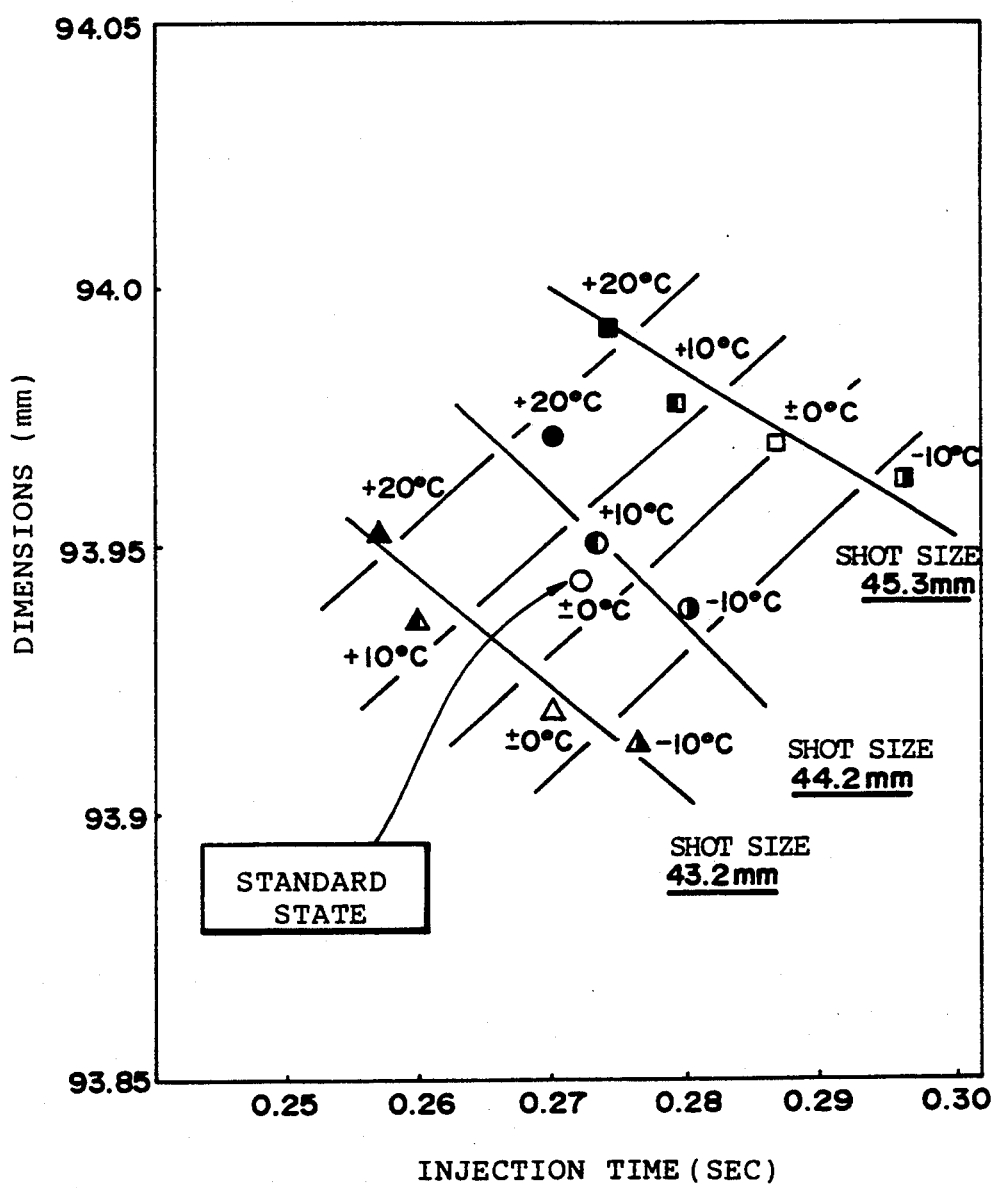
FIG. 12 is a diagram of actual measurements in the diagram of molding state.

FIG. 12 is a diagram of actual measurements in the diagram of molding state. Here temperatures of +10° C., +20° C. and −10° C., etc., indicate temperature differences relative to resin temperature (temperature sensed by a temperature sensor) in the standard state, in which the standard state is assumed to be ±0° C.

Next, a method of deciding the maximum value of standard injection pressure in the constant-speed injection process will be described.

Figure 13:
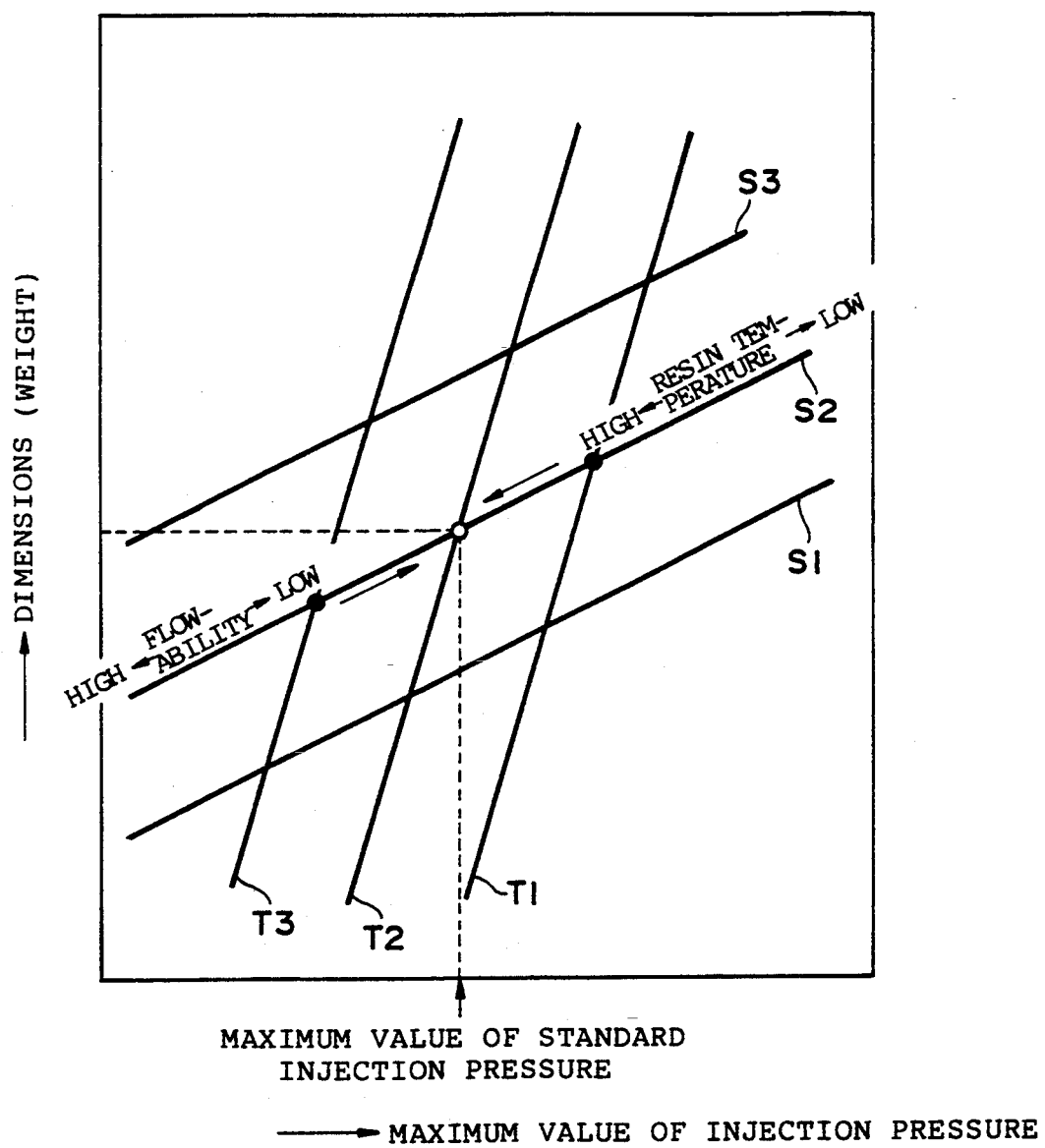
FIG. 13 is a diagram of molding state in the constant-speed injection process.

FIG. 13 is a diagram of molding state in the constant-speed injection process. The maximum value of injection pressure is plotted along the horizontal axis and dimensions (weight) of the molded article along the vertical axis. The parameters are shot size (S3>S2>S1) and resin temperature (T3>T2>T1).

A trial run of injection molding is performed under molding conditions at a large number of points on the molding-state diagram while the resin temperature and shot size are thus changed. The dimensions, weight and warpage (flatness) of molded articles thus obtained are measured or examined and the best molded article is selected. The molding conditions of the best molded article are adopted as a standard state, and the maximum value of injection pressure which prevails in such case is adopted as the maximum value of standard injection pressure.

(4-4) Control of resin temperature

The flowability of resin is strongly dependent upon temperature, as mentioned above. By controlling resin temperature while shot size is held constant (shot size which prevails at the time of the standard state), stabilization of article quality is achieved while a state equivalent to the standard state is maintained irrespective of any fluctuation in the flow property of the resin.

The quantities subjected to control are barrel temperature, sprue temperature, manifold temperature and tip temperature, temperatures at these portions of The molding machine are represented by $T_b$, $T_s$, $T_m$ and $T_t$, respectively. The temperatures measured by the sensors 61~64 are assumed to represent the temperatures of the resin at these portions.

Assume that the molten resin is a fluid which abides by a power-law model. Consider a basic formula of fluidity with regard to a fluid which flows through the flow passage comprising the barrel, sprue, manifold, tip and cavity. Here the ratio between a basic formula of fluidity in a case where the present state is changed, so as to obtain an injection time the same as that of the standard state, and a basic formula of fluidity prevailing in the present state is taken.

In the constant-pressure injection process, when the ratio in fluid pressure loss between both ends of the passageway is 1, (where the injection pressure is constant and) ratio of the state in which an injection time equal to the standard state is obtained to the state prevailing at the present time) is added to the formula representing the above-mentioned ratio between the basic formulae of fluidity, and when flow rate $Q[=(A\cdot L)/t]$ (A; a section area of an injection cylinder, L: a shot size, t: an injection time) is substituted into the formula, we have the following equation:

$$t_P/t_D = (L_P/L_D) \cdot [(K_b e^{BT_b} + K_s e^{BT_s} + K_m e^{BT_m} + K_t e^{BT_t} + K_c e^{BT_c})_P{}^n/(K_b e^{BT_b} + K_s e^{BT_s} + K_m e^{BT_m} + K_t e^{BT_t} + K_c e^{BT_c})_D{}^n] \quad \text{Eq. 1}$$

where n, B: resin flow-property constants;

$K_b$, $K_s$, $K_m$, $K_t$, $K_c$: constants decided by the shapes of the resin flow pathes respectively comprising the barrel, sprue, manifold, tip and cavity; and Suffixes D, P: respectively represent the state in which an injection time equal to the standard state is obtained, and the presently prevailing state.

The present temperatures $(T_b, T_s, T_m, T_t)_P$ on the right side of Eq. 1 are changed (controlled) to be set to the temperatures $(T_b, T_s, T_m, T_t)_D$, of the state in which an injection time equal to the standard state, in such a manner that Eq. 1 is satisfied, i.e., in such a manner that injection time becomes equal to that of the standard state.

Figure 14:
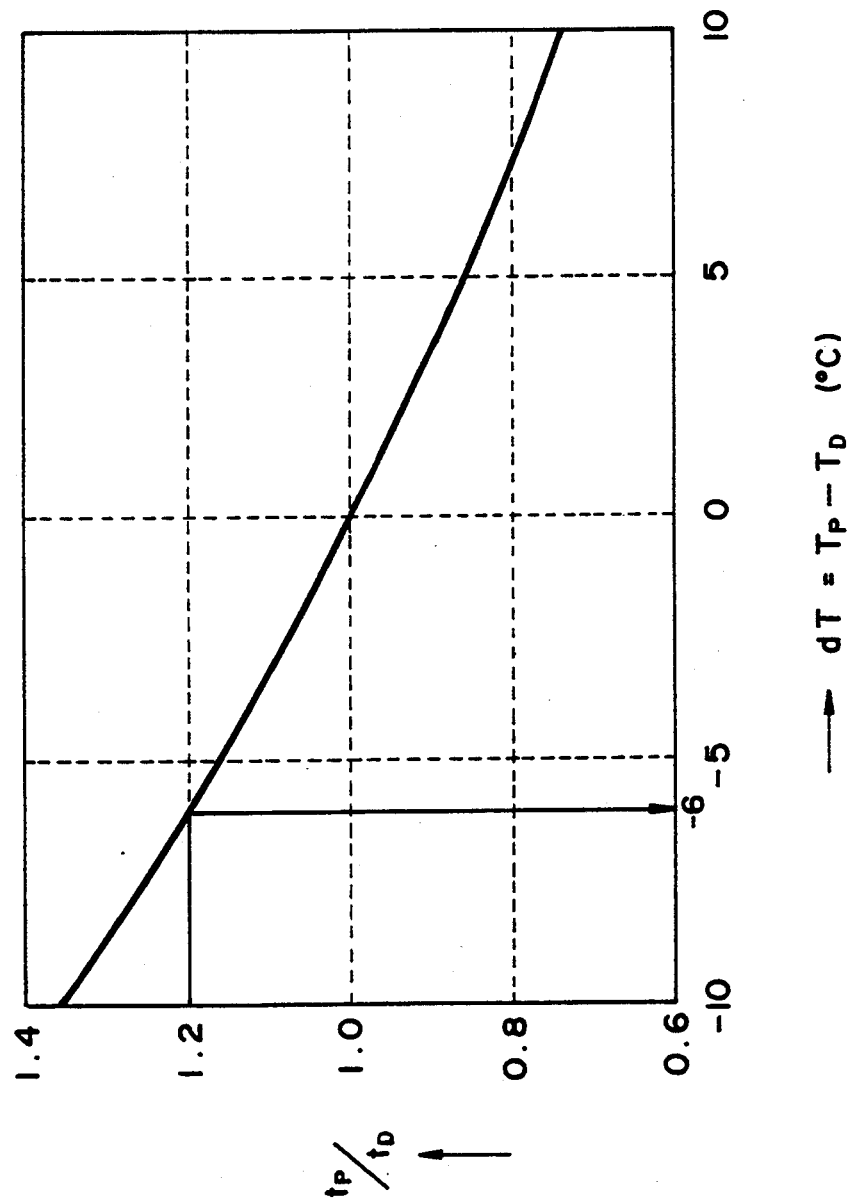
FIG. 14 is a graph showing how resin temperature control is carried out for the constant-pressure injection process.

FIG. 14 represents the relationship indicated by Eq. 1 when the substitutions n=2.2, B=−0.0137, $L_P = L_D$ are made and it is assumed that $T_b = T_s = T_m = T_t = T$ holds. Plotted along the horizontal axis is the difference $dT = T_P - T_D$, namely the difference between the present resin temperature $T_P$ and the resin temperature $T_D$ for the state in which an injection time equal to that of the standard state is obtained. Plotted along the vertical axis is the ratio $t_P/t_D$, namely the ratio of the present injection time $t_P$ to the injection time $t_D$ of the standard state.

The present injection time $t_P$ is measured in the manner described above. The injection time $t_D$ of the standard state is already known. When the ratio $t_P/t_D$ falls outside the limits of 1.1~0.9, a temperature $T_D$ (=a new set temperature $T_r$) of the state in which an injection time the same as that of the standard state is obtained is found from Eq. 1 or from the graph of FIG. 14. In the temperature setting unit 46, the set temperatures of the barrel, sprue, manifold and tip are changed to $T_r$. As a result, the flowability of the resin can be made equivalent to that of the standard state regardless of any fluctuation in the flow property of the resin. For example, if $t_P = 0.324$ sec. and $t_D = 0.27$ sec. then $t_P/t_D = 1.2$ and $dT = -6.0°$ C. is obtained from FIG. 14 or Eq. 1. Finally, $T_r = T_D = T_P - dT = T_P - (-6.0) = T_P + 6$. Accordingly, the setting should be changed to make the set temperature higher by 6° C.

It is possible to adopt an arrangement in which the changing of the set temperature in the temperature setting unit 46 is performed manually or automatically under the control of the processing unit 35.

Eq. 1 and the graph of FIG. 14 hold under ideal conditions. In actuality, Eq. 1 and FIG. 14 are revised based upon actually measured values. The revision can be performed by multiplying Eq. 1 by a suitable coefficient or by changing the slope of the graph of FIG. 14 (multiplying the scale of the horizontal or vertical axis by a coefficient), by way of example. Alternatively, a graph obtained by actual measurement may be used instead of the graph of FIG. 14.

In the foregoing, the temperatures of the barrel, sprue, manifold and tip are controlled. However, an arrangement may be adopted in which the temperature is controlled by omitting one, two or more of the foregoing. For example, an arrangement may be adopted in which only the barrel, sprue and manifold are controlled in temperature, without controlling the temperature of the tip. Conversely, as mentioned above, additional control, namely control of the temperature of the mold, may be performed utilizing the mold temperature controller 45.

In the constant-speed injection process, when the flow-rate ratio of the standard state to the state prevailing at the present time is 1 (i.e., the flow rate is constant), and is added to the formula representing the above-mentioned ratio between the basic formulae of fluidity, we have the following equation:

$$\Delta P_P/\Delta P_D = (L_P/L_D)^{1/n} \cdot \quad \text{Eq. 2}$$

$$[(K_b e^{BT_b} + K_s e^{BT_s} + K_m e^{BT_m} + K_t e^{BT_t} + K_c e^{BT_t})_P/(K_b e^{BT_b} + K_s e^{BT_s} + K_m e^{BT_m} + K_t e^{BT_t} + K_c e^{BT_t})_D]$$

where ΔP is the fluidic pressure loss and represents the maximum value of injection pressure.

The present temperatures $(T_b, T_s, T_m, T_t)_P$ on the right side of Eq. 2 are changed (controlled) to be set to the temperatures $(T_b, T_s, T_m, T_t)D$, of the state in which an injection pressure equal to the standard state, in such a manner that Eq. 2 is satisfied, i.e., in such a manner that injection pressure becomes equal to that of the standard state.

FIG. 15 represents the relationship indicated by Eq. 2 when the substitutions n=2.2, B=−0.0137 are made and it is assumed that $T_b=T_s=T_m=T_t=T$ holds. The temperature difference $dT=T_p-T_D$ is plotted along the horizontal axis. Plotted along the vertical axis is the ratio $\Delta P_p/\Delta P_D$, namely the ratio of the maximum value $\Delta P_p$ of injection pressure at the present time to the maximum value $\Delta P_D$ of injection pressure of the standard state.

The maximum value $\Delta P_p$ of present injection pressure is measured in the manner described above. The maximum pressure value $\Delta P_D$ of the standard state is already known. When the ratio $\Delta P_p/\Delta P_D$ falls outside the limits of 1.1~0.9, a temperature TD (=a new set temperature $T_r$) of the state in which a maximum value of injection pressure the same as that of the standard state is obtained from Eq. 2 or from the graph of FIG. 15. In the temperature setting unit 46, the set temperatures of the barrel, sprue, manifold and tip are changed to $T_r$. As a result, the flowability of the resin can be made equivalent to that of the standard state regardless of any fluctuation in the flow property of the resin. For example, if $\Delta P_p=2000$ Kgf/cm², $\Delta P_D=1800$ Kgf/cm² holds, then $\Delta P_p/\Delta P_D=1.11$ will hold. dT=−7.6° C. is obtained from FIG. 15 or Eq. 2. Finally, we have $T_r=T_D=T_p-dT=T_p-(-7.6)=T_p+7.6$. Accordingly, the setting should be changed so as to make the set temperature higher by 7.6° C.

It goes without saying that an arrangement can be adopted in which the changing of the set temperature in the temperature setting unit 46 is performed manually or automatically under the control of the processing unit 35. Further, in actuality it is preferred that Eq. 2 and the graph of FIG. 15 be revised based upon actually measured values. In addition, an arrangement may be adopted in which the temperature is controlled by omitting control of one, two or more of the barrel, sprue, manifold and tip, and control of the temperature of the mold may be added.

As many apparently widely different embodiments of the present invention can be made without departing from the spirit and scope thereof, it is to be understood that the invention is not limited to the specific embodiments thereof except as defined in the appended claims.

What is claimed is:

1. A method of judging a molding process for controlling a fluctuation in resin flow property in an injection molding machine, comprising the steps of:
   (a) obtaining a signal representing injection pressure from a sensor provided in at least one of an injection cylinder of the injection molding machine and a hydraulic circuit for driving the injection molding machine;
   (b) sampling said signal from said sensor for a period of time beginning prior to a start of an injection stage of a molding cycle and extending for an amount of time which exceeds a likely injection time;
   (c) detecting a rise in injection-pressure data obtained by said step of sampling, and judging that a point in time corresponding to the rise is an injection starting time;
   (d) detecting a peak value of the injection-pressure data other than a peak of the injection-pressure data which may appear immediately after the injection starting time;
   (e) judging that a point in time corresponding to the peak value, determined by said step of detecting a peak value, is an injection end time;
   (f) calculating, as an injection time, a period of time from the injection starting time to the injection end time;
   (g) obtaining the peak value of the injection pressure and the injection time in a molding cycle of the injection molding machine over a plurality of molding cycles by repeating above steps (a) to (f);
   (h) examining whether a fluctuation in flow property of a resin material supplied to the injection molding machine appears as a fluctuation in the injection time or as a fluctuation in the peak value of the injection pressure; and
   (i) judging that a constant-pressure injection process is in effect when the fluctuation appears as a fluctuation in the injection time and a constant-speed injection process is in effect when the fluctuation appears as a fluctuation in the peak value of the injection pressure.

2. A method according to claim 1, wherein when it is judged that a constant-pressure injection process is in effect, said method further comprising the steps of:
   measuring actual injection time;
   obtaining a degree of fluctuation in the measured actual injection time with respect to a standard injection time;
   judging whether the degree of fluctuation obtained exceeds a predetermined value; and
   adjusting injected resin temperature so that actual injection time will become substantially equal to the standard injection time if the degree of fluctuation obtained exceeds the predetermined value.

3. A method according to claim 1, wherein when it is judged that a constant-speed injection process is in effect, said method further comprising the steps of:
   measuring the peak value of actual injection pressure;
   obtaining degree of fluctuation in the peak value of measured actual injection pressure with respect to a peak value of standard injection pressure;
   judging whether the degree of fluctuation obtained exceeds a predetermined value; and
   adjusting injected resin temperature so that the peak value of actual injection pressure will become substantially equal to the peak value of standard injection pressure if the degree of fluctuation obtained exceeds the predetermined value.

4. A method of judging a molding process for controlling a fluctuation in resin flow property in an injection molding machine, comprising the steps of:

measuring an injection-pressure waveform in a molding cycle of the injection molding machine over a plurality of molding cycles;

examining whether a fluctuation in flow property of a resin material supplied to the injection molding machine appears as a fluctuation in actual injection time or as a fluctuation in a maximum value of actual injection pressure in the injection-pressure waveform;

judging that a constant-pressure injection process is in effect when the fluctuation appears as a fluctuation in actual injection time;

measuring an actual injection time;

obtaining a degree of fluctuation in the actual injection time with respect to a standard injection time;

judging whether the degree of fluctuation obtained exceeds a predetermined value; and adjusting injected resin temperature so that actual injection time will become substantially equal to the standard injection time if the degree of fluctuation obtained exceeds the predetermined value.

5. A method of judging a molding process for controlling a fluctuation in resin flow property in an injection molding machine, comprising the steps of:

measuring an injection-pressure waveform in a molding cycle of the injection molding machine over a plurality of molding cycles;

examining whether a fluctuation in flow property of a resin material supplied to the injection molding machine appears as a fluctuation in actual injection time or as a fluctuation in a maximum value of actual injection pressure in the injection-pressure waveform;

judging that a constant-speed injection process is in effect when the fluctuation appears as a fluctuation in said maximum value of actual injection pressure;

measuring the maximum value of actual injection pressure;

obtaining a degree of fluctuation in the maximum value of actual injection pressure with respect to a maximum value of standard injection pressure;

judging whether the degree of fluctuation obtained exceeds a predetermined value; and adjusting injected resin temperature so that the maximum value of actual injection pressure will become substantially equal to the maximum value of standard injection pressure if the degree of fluctuation obtained exceeds the predetermined value.

* * * * *